United States Patent Office 3,424,609
Patented Jan. 28, 1969

3,424,609
METHOD FOR PREVENTING ACCUMULATION OF ELECTROSTATIC CHARGES ON SHAPED ARTICLES
Wolfgang Carl, Martin Wendel, and Alfred Reichle, Dormagen, Germany, assignors to Farbenfabriken Bayer Aktiengesellschaft, Leverkusen, Germany, a corporation of Germany
No Drawing. Filed May 12, 1965, Ser. No. 455,328
Claims priority, application Germany, May 23, 1964, F 42,973/64
U.S. Cl. 117—139.5                4 Claims
Int. Cl. D06m *13/02;* C08j *1/44*

ABSTRACT OF THE DISCLOSURE

A method of preventing the accumulation of electrostatic charges on shaped articles by treating with an active compound of the formula

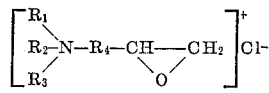

in which
$R_1$ and $R_2$ denote independently from each other a member of the group consisting of aliphatic radicals with at most 6 carbon atoms and aliphatic radicals with at most 6 carbon atoms substituted by nitrile groups, while
$R_3$ means an aliphatic radical with at least 6 carbon atoms, and
$R_4$ stands for an alkylene radical with 1–3 carbon atoms; drying the treated article and thereafter heating at about 100–150° C.

---

The present invention relates to agents for preventing the electric charge of shaped articles; more particularly it concerns agents for the said purpose which consist essentially of epoxide compounds of the formula

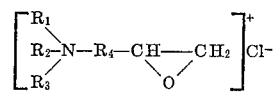

in which $R_1$ and $R_2$ denote aliphatic radicals with at most 6 carbon atoms, which may be substituted by nitrile groups, and $R_3$ denotes an aliphatic radical with at least 6 carbon atoms, while $R_4$ stands for an alkylene radical with 1–3 carbon atoms.

Such epoxide compounds are obtainable, for example, when tertiary amines of the formula

in which $R_1$, $R_2$ and $R_3$ have the meaning given above, for example, N-dimethyl-decylamine, N-dimethyl-dodecylamine, N-di-(cyanoethyl)-dodecylamine, N-methyl-N-(cyanoethyl)-dodecylamine, N-dimethyl-stearylamine, N-di-(cyanoethyl)-stearylamine, N-methyl-N-(cyanoethyl)-stearylamine and N-methyl-N-(cyanoethyl)-octylamine are allowed to react with epichlorohydrin, 1,3-dichloropropanol-2, 1,4-dichlorobutanol-3 or 1,5-dichloropentanol-4, in a molar ratio of 1 to at least 1, expediently in organic solvents, e.g. methylene chloride, at temperatures between 50 and 80° C. in the presence of salts of polyvalent metals, such as aluminum chloride, stannic chloride or boron trifluoride, and the reaction products, insofar as they are not epoxide compounds but chlorohydrin compounds, are treated in organic solvents, e.g. in isopropyl alcohol, with alkaline agents, e.g. sodium hydroxide, sodium carbonate or ammonia.

The agents according to the invention are applied in the form of solutions in organic solvents, such as alcohols, esters and ketones, or in the form of aqueous solutions, emulsions or dispersions. The agents are then generally applied to the shaped articles by spraying or impregnating at 20 to 60° C.; the articles are subsequently dried and heated for a short time at 100 to 150° C. By means of the proposed agents it is possible to impart an outstanding antistatic finish to a great variety of articles, e.g. fibres, threads, fabrics, foils or films of natural or synthetic origin.

It is already known to use chlorohydrin compounds of the formula

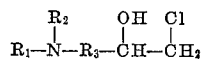

in which $R_1$ denotes an aliphatic radical with at most 6 carbon atoms, which may also be substituted by a CN group, $R_2$ means an aliphatic radical with at least 6 carbon atoms, and $R_3$ denotes an alkylene radical with 1–3 carbon atoms, or the corresponding epoxide compounds, for preventing the electric charge of shaped articles. The agents according to the present invention are superior to these agents by their surprisingly higher effectiveness.

The following examples serve to illustrate the invention without, however, limiting its scope.

EXAMPLE 1

Prewashed fabrics of polyacrylonitrile fibres are impregnated on a foulard with the solution described below, then squeezed to a weight increase of 100% and dried at 80° C. for about 45 minutes. The dried fabrics are then heated at 120° C. for a further 10 minutes. The surface resistance of the fabrics at 20° C. and at a relative atmospheric humidity of 50% is reduced by this treatment from $10^{13}$ ohms to $10^6$ ohms.

The solution employed was prepared in the following manner: 277.3 g. N-dimethyl-dodecylamine (1.3 mol) were treated dropwise, after the addition of 0.5 g. aluminium chloride, with 120.2 g. epichlorohydrin (1.3 mol). The temperature of the reaction mixture, which rose after the addition of about 40 g. epichlorohydrin, was maintained at 50– 60° C. during the dropwise addition by occasional cooling with water. When the temperature of the reaction mixture had fallen after about 5–6 hours, due to the completion of the reaction, the resultant reaction product of the formula

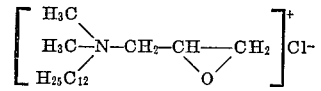

was first mixed with sufficient water to form a 40% solution; this solution was then mixed with 5.85 ml. glacial acetic acid for stabilisation; from this stock solution the 3% aqueous solution employed, which had a pH value of 6.7, was then prepared by diluting with water.

EXAMPLE 2

Prewashed fabrics of polyamide fibres are treated in the manner described in Example 1. The surface resistance of the fabrics at 20° C. and at a relative atmospheric humidity of 50% is reduced by this treatment from $10^{13}$ ohms to $10^8$ ohms.

EXAMPLE 3

Prewashed fabrics of polyamide fibres are treated on a foulard with the solution described below, then squeezed to a weight increase of 100% and dried at 80° C. for about 45 minutes. The dried fabrics are then heated at 120° C. for 10 minutes. The surface resistance of the fabrics at 20° C. and at a relative atmospheric humidity of 50% is reduced by this treatment from $10^{13}$ ohms to $10^7$ ohms.

The solution employed is prepared in the following manner: 297.57 g. N-dimethyl-stearylamine (1 mol) were mixed, after the addition of 1 g. of anhydrous powdered aluminium chloride, with 92.53 g. epichlorohydrin (1 mol), while stirring. The reaction mixture was heated to 50–60° C. and kept at this temperature for about 5–6 hours. The temperature then fell due to the completion of the reaction, and the resultant reaction product of the formula

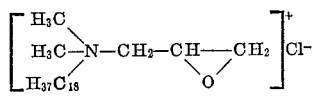

was mixed with sufficient water to form a 3% solution. The pH value of the solution was 8.2.

EXAMPLE 4

Prewashed fabrics of polyacrylonitrile fibres are treated in the manner described in Example 3. The surface resistance of the fabrics at 20° C. and at a relative atmospheric humidity of 50% is reduced by this treatment from $10^{13}$ ohms to $10^6$ ohms.

EXAMPLE 5

Prewashed fabrics of polyacrylonitrile fibres are treated on a foulard with the emulsion described below, then squeezed to a weight increase of 100% and dried at 80° C. for about 45 minutes. The dried fabrics are then heated at 120° C. for a further 10 minutes. The surface resistance of the fabrics at 20° C. and at a relative atmospheric humidity of 50% is reduced by this treatment from $10^{13}$ ohms to $10^8$ ohms.

The emulsion employed was prepared in the following manner: After the addition of 1 g. of powdered anhydrous aluminium chloride, 252 g. N-methyl-N-cyanoethyl-dodecylamine (1 mol) were mixed dropwise at room temperature, while stirring, with 92.53 g. epichlorohydrin (1 mol). The reaction mixture was then first kept at a temperature of 60–70° C. for about 10 hours and then subjected to a vacuum treatment at 10 mm. Hg and 40° C. for 4 hours. From the resultant compound of the formula

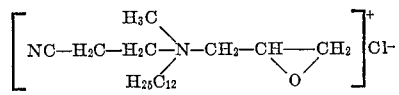

a 3% aqueous emulsion was subsequently prepared, after the addition of 4.6 ml. glacial acetic acid; the pH value of the emulsion was 5.2.

We claim:
1. A method of imparting antistatic properties to a shaped article comprising applying to said article a liquid vehicle or solvent containing an active amount of a compound of the formula

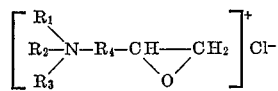

in which
$R_1$ and $R_2$ denote independently from each other a member of the group consisting of aliphatic radicals with at most 6 carbon atoms and aliphatic radicals with at most 6 carbon atoms substituted by nitrile groups, while
$R_3$ means an aliphatic radical with at least 6 carbon atoms, and
$R_4$ stands for an alkylene radical with 1–3 carbon atoms; drying the treating article and thereafter heating at about 100–150° C.

2. The method according to claim 1 wherein the compound has the formula

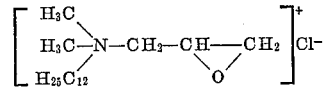

3. The method according to claim 1 wherein the compound has the formula

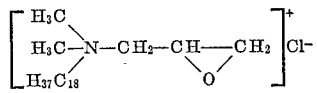

4. The method according to claim 1 wherein the compound has the formula

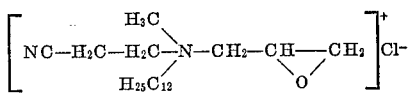

References Cited

UNITED STATES PATENTS

| | | | |
|---|---|---|---|
| 2,626,877 | 1/1953 | Carnes | 117—139.5 |
| 2,836,517 | 5/1958 | Gruber et al. | 117—139.5 |
| 2,876,217 | 3/1958 | Paschall | 260—233.3 |
| 2,862,009 | 11/1958 | Albrecht | 117—139.5 X |

WILLIAM D. MARTIN, *Primary Examiner.*

T. G. DAVIS, *Assistant Examiner.*

U.S. Cl. X.R.

117—138.8; 252—8.8